United States Patent [19]
Walker

[11] Patent Number: 5,103,924
[45] Date of Patent: Apr. 14, 1992

[54] MECHANICALLY COUPLED AUTOMATIC GUIDANCE SYSTEM FOR AGRICULTURAL TRACTORS

[76] Inventor: Dean B. Walker, 775 Lane 13½, Lovell, Wyo. 82431

[21] Appl. No.: 579,461

[22] Filed: Sep. 10, 1990

[51] Int. Cl.⁵ .............................................. B62D 1/26
[52] U.S. Cl. ................................. 180/131; 104/244.1; 172/283; 280/776
[58] Field of Search ............... 180/131, 79; 104/244.1; 280/776; 172/283, 591

[56] References Cited

U.S. PATENT DOCUMENTS

| | | | |
|---|---|---|---|
| Re. 15,214 | 10/1921 | Whipple | 104/244.1 |
| Re. 17,543 | 12/1929 | Willrodt | 104/244.1 |
| 314,072 | 3/1885 | Snyder | 104/244.1 |
| 921,004 | 5/1909 | Rohan | 104/244.1 |
| 950,604 | 3/1910 | Rogers | 104/244.1 |
| 1,047,644 | 12/1912 | James | 104/244.1 |
| 1,052,868 | 2/1913 | Wheelock | 104/244.1 |
| 1,269,609 | 6/1918 | Johnston | 104/244.1 |
| 1,283,990 | 11/1918 | Volz | 104/244.1 |
| 1,310,664 | 7/1919 | Klassen | 104/244.1 |
| 1,328,710 | 1/1920 | Burgess | 104/244.1 |
| 1,328,808 | 1/1920 | Bartholomew | 104/244.1 |
| 1,364,735 | 1/1921 | Dobson | 104/244.1 |
| 1,444,738 | 2/1923 | Funk | 104/244.1 |
| 1,501,095 | 9/1926 | Woods | 104/244.1 |
| 1,694,226 | 12/1928 | McDowall | 180/2.1 |
| 1,731,220 | 10/1929 | Zybach | 104/244.1 |
| 1,747,730 | 2/1930 | Nichol | 104/244.1 |
| 1,784,534 | 12/1930 | Nichol | 104/244.1 |
| 1,840,123 | 1/1932 | Nichol | 104/244.1 |
| 1,843,327 | 2/1932 | Koenig | 104/244.1 |
| 1,868,360 | 7/1932 | Knight | 180/131 |
| 1,888,021 | 11/1932 | Williams | 104/244.1 |
| 1,889,906 | 12/1932 | Swan | 104/244.1 |
| 2,732,640 | 1/1956 | Kirchner | 37/169 |
| 2,811,089 | 10/1957 | Blackstone | 104/244.1 |
| 3,548,966 | 12/1970 | Blacket | 180/79.2 |
| 3,765,501 | 10/1973 | Burvee | 180/79.2 R |
| 3,774,401 | 11/1973 | Allen | 60/420 |

(List continued on next page.)

FOREIGN PATENT DOCUMENTS

| | | | |
|---|---|---|---|
| 2014235 | 10/1971 | Fed. Rep. of Germany | 104/244.1 |
| 2818709 | 11/1979 | Fed. Rep. of Germany | 180/131 |
| 511892 | 6/1976 | U.S.S.R. | 180/131 |

OTHER PUBLICATIONS

Robotic Driver Literature (undated).

*Primary Examiner*—Charles A. Marmor
*Assistant Examiner*—Alan M. Kagen
*Attorney, Agent, or Firm*—Lynn G. Foster

[57] ABSTRACT

A simple and inexpensive, mechanically coupled automatic guidance system for tractors comprising a ground line sensor which is directly coupled to a steering system comprising limited, partial, spatial disengagement or play about a narrow steering angle within which the automatic guidance system provides steering control, unencumbered by the forces of the primary steering system, especially the steering forces of a power-steered-tractor. The play in the steering system provides spatial relief of steering forces which could not otherwise be overridden by a purely mechanical system. The ground line sensor comprises three degrees of freedom permitting adjustable variation to the shape, breadth, and attitude of the sensor to conformably match a previously prepared ground line. At least two movement degrees of freedom allow the sensor to horizontally and vertically follow ground line and tractor path anomalies while providing feedback to the automatic guidance system. A sensor attachment tongue vertical controller allows an operator to disengage the ground line sensor allowing alternate safe operation of the steering system without damage to the steering system or to the automatic guidance system. The limited range of the automatic steering angle provides for re-engagement of the primary steering system by turning the primary steering beyond the narrow automatic steering angle. Thus, when the automatic guidance system is disengaged from the ground line, the tractor is dirigible only by the primary steering system.

56 Claims, 6 Drawing Sheets

U.S. PATENT DOCUMENTS

| | | | |
|---|---|---|---|
| 3,844,372 | 10/1974 | Neece | 180/79.1 |
| 3,982,603 | 9/1976 | Michael | 180/131 |
| 4,165,796 | 8/1979 | Petz | 180/131 |
| 4,299,172 | 11/1981 | Dawson | 104/247 |
| 4,345,659 | 8/1982 | Arnold | 180/131 |
| 4,366,756 | 1/1983 | Brum | 104/244.1 |
| 4,367,802 | 1/1983 | Stiff et al. | 180/131 |
| 4,406,232 | 9/1983 | Fasse | 104/244.1 |
| 4,428,449 | 1/1984 | Lang | 180/131 |
| 4,505,094 | 3/1985 | Demorest | 56/10.2 |
| 4,607,716 | 8/1986 | Beck | 180/131 |
| 4,616,712 | 10/1986 | Jorgensen | 172/6 |
| 4,640,365 | 2/1987 | Schmidt | 172/26 |

MECHANICALLY COUPLED AUTOMATIC GUIDANCE SYSTEM FOR AGRICULTURAL TRACTORS

FIELD OF INVENTION

This invention relates to automatic guidance systems for tractors and more specifically to mechanically coupled steering systems which are adapted to power-steered agricultural tractors.

DESCRIPTION OF RELATED ART

Automated guidance mechanisms for various types for traction vehicles and agricultural tractors have been known since the latter half of the nineteenth century. Earliest guidance systems generally employed wheel or other mechanical furrow, groove, or edge (ground mark) sensing components each comprising a directly coupled feedback to a mechanical vehicle steering system. Where power to steer the vehicle is derived exclusively from the mechanical gain in the steering wheel to dirigible wheels, sufficient force is derived from a ground mark sensor, when multiplied by length of a lever arm, to correct for a steering error through a directly coupled connection. Numerous prior guidance systems have comprised wheel, sled, and the like sensor components, directly mechanically coupled to such a steering mechanism. Patents which fall into this category comprise the following:

| U.S. Pat. No. | Date | U.S. Pat. No. | Date |
| --- | --- | --- | --- |
| 314,072 | Mar 17, 1885 | 1,444,738 | Nov 25, 1921 |
| 921,004 | May 11, 1909 | Re. 15,214 | Aug 31, 1921 |
| 950,604 | Mar 1, 1910 | 1,601,095 | Jul 6, 1925 |
| 1,047,644 | Dec 17, 1912 | Re. 17,543 | Jun 30, 1926 |
| 1,052,868 | Feb 11, 1913 | 1,747,730 | Nov 10, 1928 |
| 1,269,609 | Jun 18, 1918 | 1,840,123 | Mar 6, 1931 |
| 1,283,990 | Nov 5, 1918 | 1,843,327 | May 25, 1931 |
| 1,310,664 | Jul 22, 1919 | 1,888,021 | Nov 15, 1932 |
| 1,328,710 | Jan 20, 1920 | 1,889,906 | Dec 6, 1932 |
| 1,328,808 | Jan 27, 1920 | 2,811,089 | Oct 29, 1957 |
| 1,364,735 | Jan 4, 1921 | 3,548,966 | Dec 22, 1970 |

More sophisticated systems comprising hydraulic and electrically driven powered steering have generally led to guidance systems which interface hydraulically or electrically with a steering controller, rather than through direct interface to the mechanical steering mechanism or, even more directly, to the dirigible wheels. Such interfaces are generally electronic, electrical, or hydraulic in nature and comprise relatively complex and expensive electric and fluidic circuits and further must deal with complex guidance problems of lead and lag. Because the force which is generated by a power steering system usually is able to overpower any reasonably derived steering force from a ground mark sensing component multiplied by the length of a practical lever arm, there are no known, purely mechanically based, guidance systems used with power steered agricultural tractors. Stated otherwise, all known guidance systems for power steered agricultural tractors comprise fluidic or electrical gain and directly communicate with an operating power steering system rather than with a steering mechanical coupling to the dirigible wheels. Known patents which comprise hydraulic or electrical interfaces comprise the following:

| U.S. Pat. No. | Date | U.S. Pat. No. | Date |
| --- | --- | --- | --- |
| 1,694,226 | Dec 4, 1928 | 4,366,756 | Jan 4, 1983 |
| 1,868,360 | Jul 19, 1932 | 4,406,232 | Sep 27, 1983 |
| 3,765,501 | Oct 16, 1973 | 4,428,449 | Jan 31, 1984 |
| 3,774,401 | Nov 27, 1973 | 4,505,094 | Mar 19, 1985 |
| 3,844,372 | Oct 29, 1974 | 4,616,712 | Oct 14, 1986 |
| 3,982,603 | Sep 28, 1976 | 4,607,716 | Aug 26, 1986 |
| 4,345,659 | Aug 24, 1982 | 4,640,365 | Feb 3, 1987 |

BRIEF SUMMARY AND OBJECTS OF THE INVENTION

In brief summary, this novel invention alleviates problems related to automatically guiding an agricultural tractor, by which a farm implement is drawn, with a simple and inexpensive, directly mechanically coupled ground-engaging sensor. The invention comprises availability of limited, partial, spatial disengagement or play, at any power steering position, defining a narrow predetermined steering angle within which an automatic guidance steering is achieved. The play provides spatial relief of power steering forces which could not otherwise be overridden by a purely mechanical system. Mechanical feedback, derived directly from a ground mark sensor and amplified, if and as desired, through leverage, is mechanically coupled to steer the tractor within the predetermined angular range.

A sensor support is provided which comprises at least three degrees of freedom permitting adjustable variation to the shape, breadth, and attitude of the ground-engaging sensor to conformably match the structure and curvature of a previously prepared ground line, such as a furrow, or the like. At least two movement degrees of freedom allow the sensor to horizontally and vertically follow ground line while providing feedback.

A sensor controller, when activated in one way, permits the operator to disengage the ground mark sensor, allowing safe operation of the primary power steering system without damage to the steering system. Activation of the sensor controller in another way engages the ground mark sensor for steering as mentioned above.

The limited range of the steering angle of play provides for overriding thereof by the power steering system. Thus, when the sensor is disengaged from the ground line, windrow, ditch, or the like, the agricultural tractor is dirigible by the standard power or primary steering system. In normal operation, the tractor, with the sensor in the disengaged position, is moved into alignment with a ground line defining a path to be followed by the tractor. The sensor is placed in the ground engaging position and the tractor is displaced and automatically guided along the line. At the end of a row or when the operator otherwise elects to resume steering control of the tractor, the ground-engaging sensor is deactivated or made inoperative, and the tractor is steered by the operator through its primary steering system.

With the foregoing in mind, it is a significant object to overcome or alleviate problems of the past in automated in-field dirigible control systems for agricultural tractors used to pull a farm implement.

Accordingly, it is a primary object to provide a novel automated in field tractor guidance system which does not supplant but operates in conjunction with the standard tractor steering system.

It is another object to provide a novel dirigible control comprising a ground engaging sensor for accurate automated windrow-controlled displacement in-field displacement of an agricultural tractor and implement.

It is a principal object to provide a novel agricultural auxiliary steering control which supplies a predetermined amount of play through which said steering control drives the tractor accurately in the field notwithstanding the primary steering system of the tractor.

It is a further principal object to provide an automatic agricultural tractor guidance system which steers a power-steered-tractor within a limited steering range using only the forces provided by a ground-engaging sensor mechanically communicated through sensor support structure.

It is an important object to provide a ground line sensor and sensor support structure which comprise a plurality of adjustment degrees of freedom whereby the sensor is set to conformably fit the dimensions of the ground line, comprising a furrow, groove, ditch, windrow, or the like.

It is an further important object to provide a ground line sensor and sensor support structure, which comprise a plurality of degrees of freedom of movement whereby the sensor follows and feeds back ground line information and/or tractor path anomalies.

It is a chief object to provide a selectively operable in-field dirigible control system comprising a disengagement apparatus whereby a ground line sensor is selectively disengaged from a ground line permitting operator-controlled steering of the tractor independent of in-field dirigible control system It is another paramount objective to provide an auxiliary dirigible control system for a selectively activated and deactivated in-field control of an implement-pulling agricultural tractor.

These and other objects and features of the present invention will be apparent from the detailed description taken with reference to accompanying drawings.

DETAILED DESCRIPTION OF THE ILLUSTRATED EMBODIMENTS

In this description, the terms forward and frontal are used to indicate a direction toward or a location beyond the front of an agricultural tractor by which a farm implement is pulled. The terms rearward or rear refer to a direction toward or location beyond the back of the tractor. Reference is now made to the embodiments illustrated in FIGS. 1–18 wherein like numerals are used to designate like parts throughout. This invention comprises a novel in-field agricultural tractor guidance or dirigible control system, which provides a direct mechanical linkage between a ground sensor and at least one of the tractor's dirigible wheels and operates through a narrow guidance angle within which the tractor steering system is uncoupled from the dirigible wheels, thus providing automatic, mechanical, closely coupled guidance for agricultural tractors, including such tractors equipped with power steering. All parts of the tractor guidance system, unless otherwise specified are steel.

Figures 1, 7:
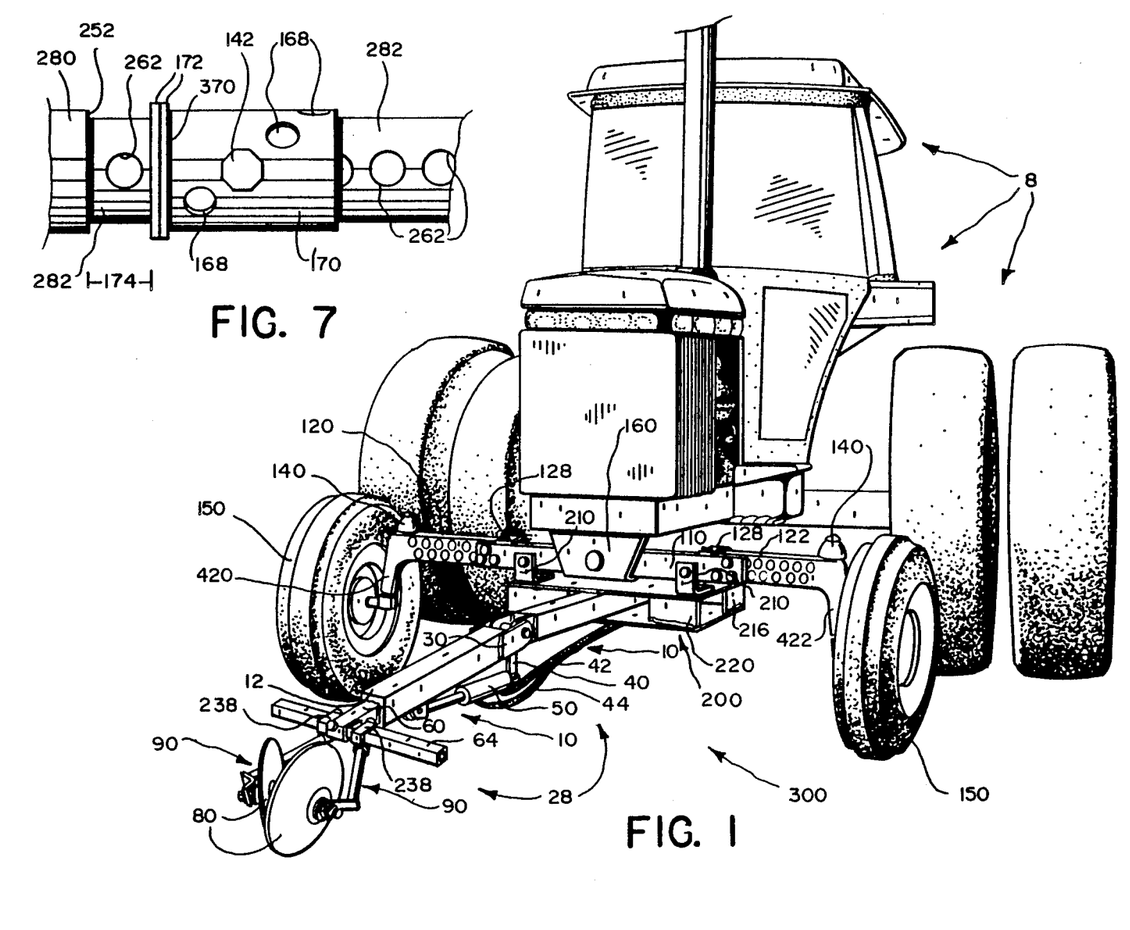
FIG. 1 is a right frontal perspective of a tractor equipped with an automatic in-field dirigible control system comprising a mechanically coupled ground line sensor with parts of the tractor, ancillary equipment and an implement drawn by the tractor removed for clarity.
FIG. 7 is an enlarged fragmentary elevational view of a lateral angle limiting, guide cylinder on a tractor steering rod.

The frontal portion of one currently preferred embodiment is shown in FIG. 1. In a frontal view of this embodiment, the guidance system, generally designated 300, is seen to comprise a ground line sensing assembly 28 which comprises a disk assembly 90, a tongue assembly 10, and a tongue support frame 200, although other ground sensing structures which provide similar torque levels mechanically transmittable to the rearward guidance structures are within the scope of this invention. As seen in the forward looking view of the rear of the front wheel steering assembly in FIG. 5, guidance system 300 further comprises a guide rod mechanism 268, which mechanically attaches and transmits ground sensed signals to each steering rod 260, and a steering angle limiting cylinder, shown as cylinder 170 in Figure 5, on each steering rod 260.

Figures 2, 10:
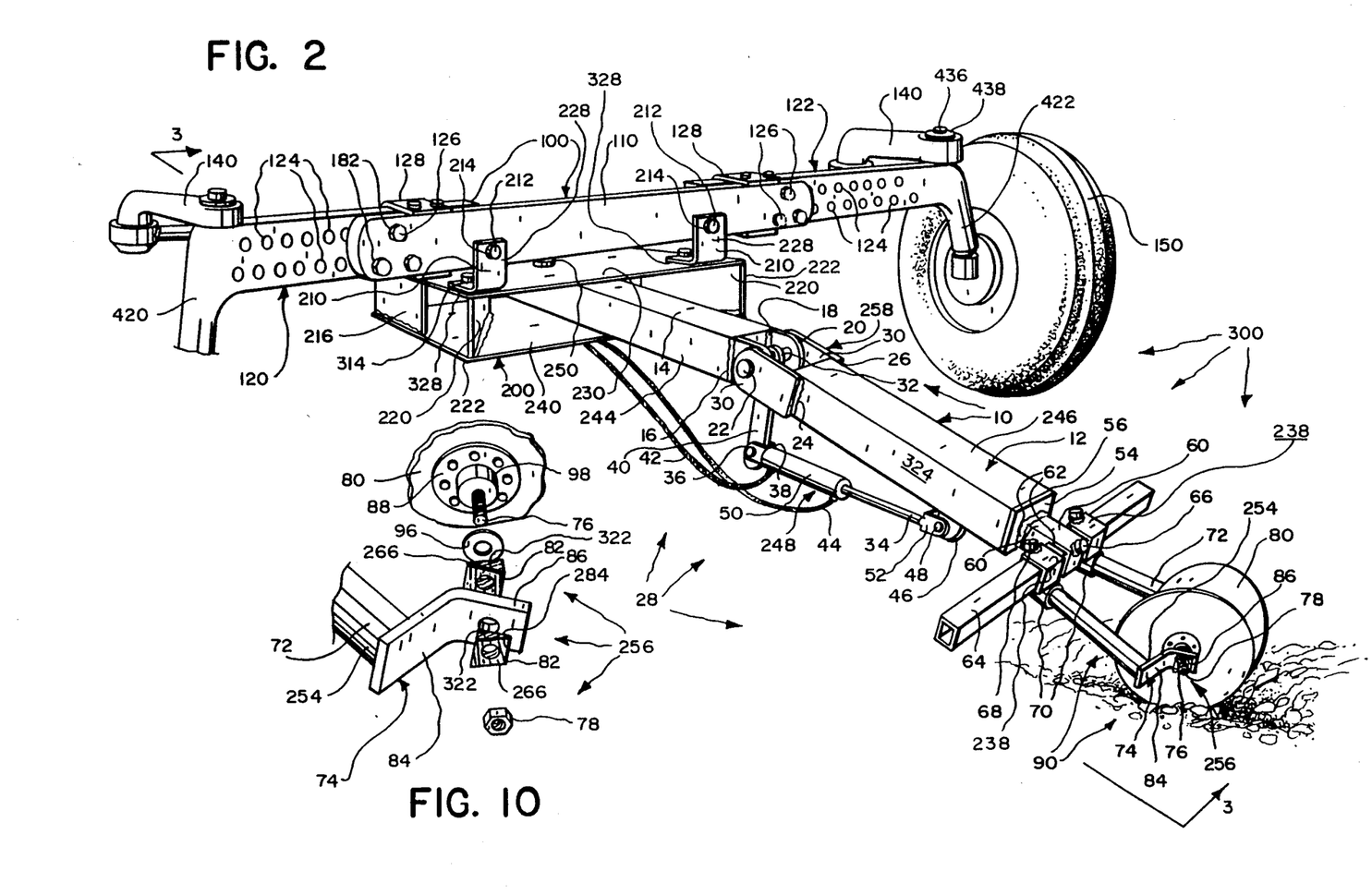
FIG. 2 is an enlarged left frontal fragmentary perspective of the front axle of the tractor of FIG. 1, illustrating the ground line sensor in greater detail.
FIG. 10 is an enlarged fragmentary exploded perspective of the parts of the disk attachment shown in FIG. 4.
Figures 3, 4, 6:
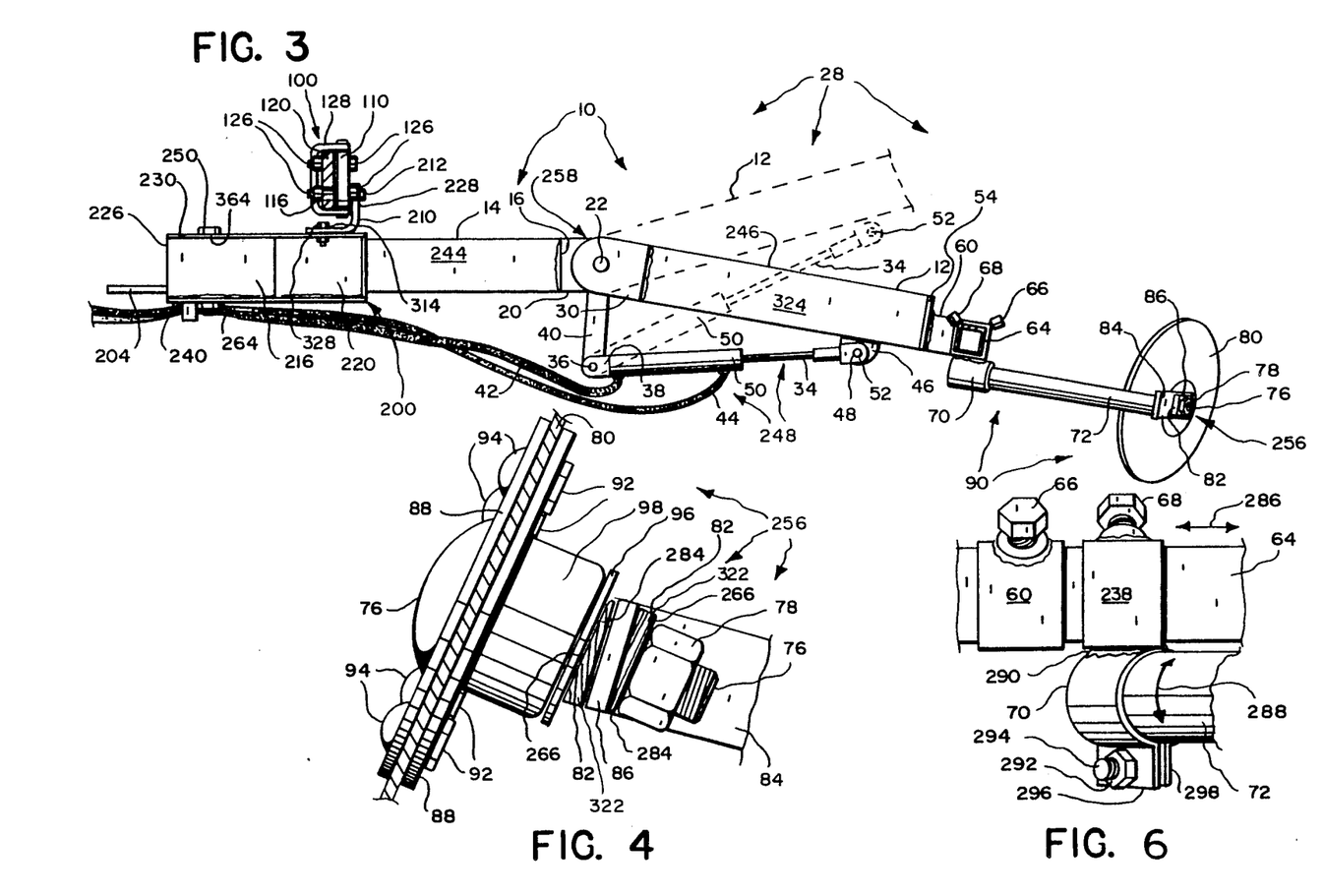
FIG. 3 is a side elevational view of the ground line sensor taken along lines 3—3 of FIG. 2.
FIG. 4 is an enlarged perspective of a disk attachment of the sensor shoving wedges by which a desired toeing angle is set.
FIG. 6 is an enlarged fragmentary perspective of the disk assembly attachment to a front cross member which resides on the guide tongue of the ground line sensor.

Reference is now made to FIGS. 2-4 and 9-10 wherein details of the frontally attached ground line sensing disks are best seen. As seen in FIGS. 2 and 3, disk assembly 90 comprises a cross member 64, a set screw 66, and a disk attachment apparatus 256 comprising two disks 80 and an extension rod 72 and a rod clamp 70 attached to each of two rectangular slide brackets 238 for each disk 80.

Figure 9:
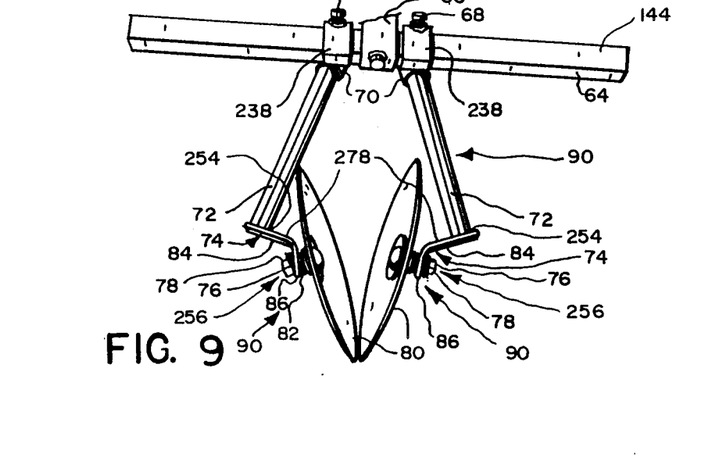
FIG. 9 is an enlarged fragmentary frontal perspective of the disk assembly portion of the ground line sensor.

Cross member 64 is illustrated as being a piece of square bar stock two inches on a side, which may be thirty-six inches long and is centrally, releasibly affixed to a forward support member 60 by a set screw 66 as described in detail later. On each side of forward support member 60, at least one rectangular slide bracket 238 may be releasibly affixed. Each rectangular slide bracket 238 comprises a hollow rectangular shape which is slidably adjustable along cross member 64. Welded at weldment 290 to the bottom of each rectangular clamp 238 is angularly disposed rod clamp 70, best seen in FIG. 6. Rod clamp 70 is essentially cylindrical in shape with a longitudinal slit extending the length of the bottom of the cylinder where two outwardly extending planar ears 296 and 298 are disposed. Ears 296 and 298 each comprise a commonly aligned aperture through which a bolt 294 passes. The cylinder of rod clamp 70 is sized to compressibly hold a forwardly extending rod 72 firmly in place when a nut 292 is tightened upon bolt 294 drawing ears 296 and 298 closely together. Thus, loosening nut 292 allows disk rod 72 to be rotated to a desired position and provides a first adjustment degree of freedom about a rotational angle 288 (see FIG. 6) whereby the orientation o a forwardly attached disk 80 is set to conform to a contoured side of a ground mark. As best seen in FIG. 9, the longitudinal axis of the cylinder of rod clamp 70 is oriented approximately thirty degrees off an axis normal to cross member 64, which is the associated longitudinal axis of rectangular slide bracket 238 such that when extension rod 72 extends forward from rod clamp 70 the disk assembly 90 also extends laterally such that two disks 80 inwardly toed form a "V" for narrow ground lines. At a corner or face of each rectangular slide bracket 238 away from the attachment face of rod clamp 70, a threaded aperture and set screw 68 is disposed such that, after rectangular clamp 238 is moved to a desired lateral position on cross member 64, set screw 68 is tightened to provide a second adjustment degree of freedom as indicated by arrows 286 (see FIG. 6) for adjusting a forwardly attached disk 80 laterally to conform to the width of a ground line. Attachment of each disk 80 is described in detail later.

Each extension rod 72 may be a one and one-quarter inch in diameter hollow steel tube comprising a one-eighth inch thick sidewall and is of sufficient length that a connected disk 80 rotates without competition from the front of forward support member 60. In the currently preferred embodiment, each extension rod 72 is preferably sixteen inches long. The forward end of each extension rod 72 comprises a perpendicular end cut 254 to which an L-shaped member 74 is welded. Each L-shaped member 74 comprises a long leg 84 and a short leg 86. With the "L" of L-shaped disk attachment member 74 bending forward, long leg 84 is welded to perpendicular end cut 254 cf associated extension rod 72. The smaller angle of the "L" bend of L-shaped member 74 is approximately 120 degrees to provide a nearly perpendicular orientation of short leg 86 with the frontal plane of cross member 64 when the top edge 278 of long leg 84 is rotated to be in a plane parallel to the top 144 of cross member 64 and short leg 86 is centrally disposed.

Short leg 86 comprises an aperture by which disk attachment apparatus 256 is assembled to the forward end of tongue assembly 10. Each disk 80, associated with the disk attachment apparatus 256, is formed of a circular, 14 gauge stainless steel plate, fourteen inches in diameter, although different materials, material thicknesses, and disk diameters can be used within the scope of this invention.

Referring to FIG. 4 and especially to the exploded view in FIG. 10, disk attachment apparatus 256 comprises a central bolt 76, a plurality of disk attachment bolts 94 and nuts 92, a ball bearing 98 comprising two disk attachment rings 88, a washer 96, two toe adjustment wedges 82, and a locking nut 78. Reinforcement for the disk 80 about the central attachment assembly is provided by the two attachment rings 88. Each ring 88 comprises a plurality of holes, one central and a plurality of holes uniformly disposed at a common radial distance where one ring 88 on each side of disk 80 is bolted or riveted. In the currently preferred embodiment, a plurality of bolts 94 and nuts 92 are joined through the off center holes to affix rings 88 to each disk 80.

Cylindrical ball bearing assembly 98 is a standard steel ball bearing unit purchased from Case International Company, Racine, Wisconsin, and comprises the two disk attachment rings 88 and a central aperture through which bolt 76 inserts. Interfacing washer 96 also comprises two planer surfaces and an aperture for bolt 76. Two identical wedges 82 sandwich short leg 86 and comprise a mechanism for a third adjustment degree of freedom of adjustment for setting the position of each disk 80 to conform the depth and form of a ground mark. Each wedge 82, fabricated as a cast steel part, comprises a rectangular base 266 and two opposing triangular sides 322. The acute base angle 284 of each triangle is approximately fifteen degrees, although different angles may used within the scope of the invention to provide wider or narrower range of adjustment. Each wedge 82 comprises an aperture for bolt 76 oriented normal to the surface of base 266 for reasons described hereafter. Short leg 86 also comprises an aperture for bolt 76, but somewhat larger than the other apertures such that bolt 76 is rotatable through an angle twice the magnitude of the acute base angle 284 of each wedge 82 triangle. Nut 78 is sized to threadably fit on bolt 76.

In order of assembly, each ring 88 is affixed to disk 80, to attach ball bearing assembly 98, and bolt 76 is inserted through the common aperture. Bolt 76 is further serially inserted through the apertures in washer 96, a first wedge 82 oriented such that base 266 contacts a face of washer 96, short leg 86, and a second wedge 82 oriented with base 266 distal to short leg 86. Wedges 82 are oriented such that the acute base angle 284 of the first wedge 82 is axially aligned with the side opposite acute base angle 284 of the second wedge 82. This alignment allows wedges 82 to be commonly rotated without changing the alignment of bolt 76 with disk 80, bearing 98, washer 96, each wedge 82, and nut 78. However, as the wedges 82 are commonly rotated 180 degrees, the plane of orientation of the disk attachment apparatus 256 relative to the plane of short leg 86 contact face is varied through an angle of twice the acute base angle 284 of each wedge 82 triangle, providing a third degree of freedom of adjustment of disks 80 relative to a ground mark.

As mentioned earlier and as best seen in FIGS. 2 and 3, disk attachment apparatus 256 is releasibly affixed to cross member 64. Cross member 64 is further releasibly affixed to a forward support member 60, being slidably inserted through a square cut aperture therein. A set screw 66 firmly, but releasibly affixes cross member 64 in a desired position in aperture 62. This adjustment is not regarded as an additional degree of freedom because the direction of movement is the same as shown by arrows 286 in FIG. 6, although greater lateral adjustment is possible when the position of cross member 64 is adjusted in forward support member 60. Forward support member 60 is permanently affixed to facing cap 54 of front tongue member 12 which is a primary component of tongue 10. Forward support member 60 comprises a frontal extension on front tongue member 12 which may be approximately four inches and is made from two and one-half inch square steel extrusion. In addition to forward support member 60 and front tongue member 12, tongue 10 comprises a centrally dispose hinge 258, rear tongue member 14, hydraulic cylinder assembly 248, and tongue bolt 250.

Front tongue member 12 comprises a forward end 56 facing cap 54, a long body part 246, a hinge support tab 46 for the cylinder assembly 248, and two hinge members 30 for the hinge 258. Long body part 246 may be made from a four inch square, one-eighth inch thick, hollow steel extrusion thirty-six inches long. On the forward end 56 of long body part 246, the square cap 54, which may be one-fourth inch thick and of the same cross sectional dimensions of body part 246, is welded. Thereat, forward support member 60 is centrally welded to the frontal side of square cap 54. At the rear of long body part 246 a hinge member 30 is welded to the face of each vertical side 324. Each hinge member 30 is a steel plate one-fourth inch thick and comprises the same width as a vertical side 324 of long body part 246 and a length of approximately eight inches. Each hinge member 30 constitutes a parallel plate through which an aperture, aligned with a like aperture in the associated hinge member 30 on the opposite side of long body part 246,, provides for insertion of a hinge bolt 22 which hingeably connects front tongue member 12 to rear tongue member 14.

Front cylinder support tab 46 is nearly centrally disposed along the bottom side of front tongue member 12 and permanently welded thereat. Front cylinder support tab 46 is a longitudinally and downwardly extending ear comprising an aperture for a hingeable connection to hydraulic cylinder assembly 248 and may be made from three-fourths inch thick steel plate, while providing sufficient length (such as approximately 3 inches) and width (such as approximately two and one-half inches) to safely provide a connecting hingeable aperture for hydraulic cylinder assembly 248.

Rear tongue member 14 comprises forward ear extensions 20, rear body part 244, two vertically disposed apertures (not shown) for hingeable attachment to a tongue support frame 200, and a rearward hydraulic cylinder assembly 248 support 40. Rear body part 244 is formed from the same material used for long body part 246 and is substantially the same length. A forwardly extending ear 20 is welded to each vertical forward side end 16 an 18 of body part 244. The free planar dimension of each ear 20 is similar to the free planar dimension of each hinge member 30, however each ear 20 may be approximately two inches shorter than each hinge member 30 because ear 20 is connected by a butt-weld rather than by a facing weld to provide an interleaving separation of ears 20 which insert between hinge members 30 to form hinge 258, described in more detail later.

Support 40 is a narrow flat steel strip or plate in the nature of a lug comprising the same width and thickness dimensions of front cylinder support tab 46, but may be eleven inches long in some configurations. Support 40 extends downward from the inward side of an ear 20 to connect through a hingeable aperture in support 40 to hydraulic cylinder assembly 248 such that hydraulic cylinder assembly 248 is disposed in a nearly horizontal plane when connected between support 40 and front cylinder support tab 46 and when disks 80 are at ground level.

Figure 5:
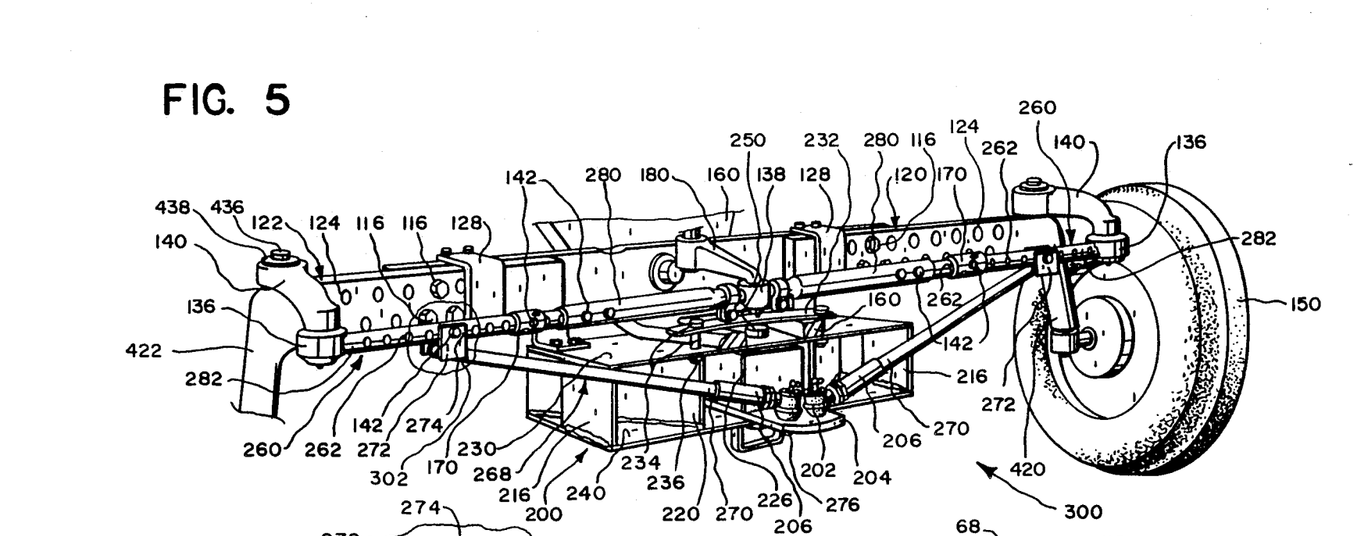
FIG. 5 is a rear fragmentary perspective of the tractor front wheel assembly showing guide and steering rods with lateral angle limiting, guide cylinders.

As best seen in FIG. 3, the rearward segment of rear tongue member 14 comprises aligned apertures 264 and 364 through which a vertical tongue bolt 250 passes to hingeably attach tongue 10 to tongue support frame 200 as later described. As seen in FIGS. 3 and 5, a rearward extension of the bottom plate of rear body part 244 provides a rear tongue plate 204 whereat the tongue is hingeable attached to each guide rod 270 as described hereafter.

Front tongue member 12 is hingeably connected to rear tongue member 14 by positioning apertures in each hinge member 30 and each ear extension 20 in juxtaposed alignment and passing a bolt 22 therethrough and affixing bolt 22 thereat with a nut (not shown). So made, the hingeable connection provides a vertical mobile degree of freedom such that ground mark sensing disks 80 are free to ride up and down across vertical variations in the ground mark without undue stress on the disks 80 and tongue 10.

Hydraulic cylinder assembly 248 comprises hydraulic line attachment tubes 42 and 44, rearwardly disposed U-shaped hinge bracket 38, hydraulic cylinder 50, and forwardly disposed U-shaped hinge bracket 52. Hydraulic cylinder 50 is a standard hydraulic cylinder comprising a two inch bore and an eight inch stroke, and is distributed by Lintons, Powell, Wyoming, although any similar hydraulic cylinder of similar dimensions may be used. Hydraulic cylinder 50 comprises a cylinder rod 34 which further comprises threadably attached U-shaped hinge bracket 52. Hydraulic line attachment tubes 42 and 44 comprise connections to hydraulic cylinder 50 as shown in FIGS. 1-3. Tubes 42 and 44 extend from connection with hydraulic cylinder 50 to a control valve in the tractor (not shown) where an operator selectively switches hydraulic pressure signals between the two tubes.

U-shaped hinge bracket 38, comprising aligned apertures by which a hingeable connection is made to support 40, is permanently affixed to the rear of hydraulic cylinder 50 by passing a bolt 36 through the juxtaposed apertures in U-shaped bracket 38 and a hole in support 40, interleaved between U-shaped bracket 38, and affixing bolt 36 with a nut (not shown). Similarly, a hingeable connection is made to front cylinder support tab 46 by aligning apertures in U-shaped bracket 52 with the aperture in tab 46 and passing a bolt 48 therethrough, thereafter affixing the connection with a nut (not shown). Two positions of the front tongue member 12 and disk assembly are shown in FIG. 3. In solid line construction, the "disk-down" or sensing position is shown. In dashed line construction, the "disk-up" position of front tongue member 12 is shown in part. Rear hydraulic line attachment tube 42 and frontal hydraulic line attachment tube 44 each carry a hydraulically transmitted signal which either raises the front tongue member 14 and attached disk assembly 90 from ground communication or, alternatively, lovers the same parts such that ground engaging disks 80 are placed into a ground line wherefrom information is derived to automatically guide the tractor 8. As an example, a positive pressure hydraulic signal through line attachment tube 42, combined with no pressure signal in line attachment tube 44, causes cylinder rod 34 to extensively proceed outward to raise front tongue member 12. Releasing hydraulic pressure from line attachment tube 42 while providing a positive hydraulic pressure signal in tube 44 retractably shortens the effective combined length of cylinder 50 and cylinder rod 34 to lover front tongue member 12. When front tongue member 12 is lowered such that disks 80 contact a ground mark to be sensibly used, all hydraulic signals are removed to allow the sensing to freely follow the vertical contour of a ground mark.

Tongue support frame 200 comprises a top plate 230, a bottom plate 240, two L-shaped brackets 210, a top support plate 232, a side support plate 216 on each rear lateral side of tongue support frame 200, and an angled support plate 220 extending inwardly from each front lateral side of tongue support frame 200 as best seen in FIGS. 2 and 5. All plate parts of tongue support frame 200 may be made from fourteen gauge steel. Top plate 230 and bottom plate 240 are illustrated as being identical and may comprise dimensions of approximately ten inches wide and thirty-three inches long. Each side support plates 216 may be eight inches long and five inches wide, the width determining the open, vertical space in tongue support frame 200. Tractors of different structural dimensions may require modification of the above related dimensions; such modifications are within the scope of this invention. Each angled support plate 220 is the same width as side support plates 216 and comprises a length of approximately fourteen inches, but, in any event, is not so long that either angled support plate 220 extends beyond the edge of plate 230 or interferes with lateral, steering travel of the tongue 10.

Tongue support frame 200 is of rectangular box-like construction wherein each side support is welded in normal orientation, top and bottom, to rear lateral edges of top and bottom plates, 230 and 240, respectively. Angled support plates 220 are also joined by weldments made perpendicular to top and bottom plates, 230 and 240, respectively. Each angled support plate 220 is joined to top plate 230 and bottom plate 220 at a forward corner 222 and is angled inward, providing a vide free central arc for movement for tongue 10 at the front of tongue support frame 200. The inward angle of each support plate 220 is the greatest inwardly directed angle which allows tongue 10 to swing through a maximum steering angle without contacting a support plate 220.

As seen in FIG. 2, each L shaped mounting bracket 210 may be made from a single 14 gauge steel plate, bent at a right angle to comprise nearly symmetrical base member 328 and riser member 228. Each riser member 228 comprises a mounting aperture 214 for a bolt 212 whereby brackets 210 are affixed to the central axle 110 of the tractor 8. Each base member 328 comprises a mounting aperture 314 which is juxtaposed above a similar aperture in top plate 230 whereby each bracket 210 is affixed to the tongue support frame 200. As seen in FIG. 2, each L-shaped mounting bracket 210 is mounted on a front corner 222 of top plate 230. The rising segment 228 of each bracket 210 is affixed by a bolt 212 through an aperture 214 and similar aperture in the central axle 110 to central axle 110. If a hole in tractor axle 110 does not preexist, this singular modification to the tractor 8 is required to mount ground sensing assembly 300 to tractor 8. Typically, all other attachments and connections between the tractor 8 and the sensing assembly 28 are made into existing connecting apertures and across existing structures, although other tractor modifications could be made within the scope of the invention.

As seen in FIG. 5, mounting plate 232 comprises a narrow rectangular plate affixed across existing tractor body structure 160. Mounting plate 232 is a long rectangular strip which extends across the tractor body structure 160 and beyond any lateral point of interference with the rear end 226 of tongue 10. Mounting plate 232 is affixed to support frame 200 by passing two bolts 234 through aligned apertures in mounting plate 232 and support frame 200 and fastening each bolt 234 with a nut 236.

Tongue 10 is hingeably connected to the tongue support frame 200 by a vertical tongue bolt 250 as best seen in FIG. 3. Vertical tongue bolt 250 is connected through four vertically aligned apertures, one in each of top plate 230 and bottom plate 240, apertures 264 and 364, respectively, and two disposed at the rear of tongue 10. In each aperture 264 and 364, one and one-fourth inch ball bearings are mounted to provide bearing supported horizontal travel for the tongue 10 within the support frame 200. Such ball bearings and methods for mounting are well known in the art. The rear tongue plate 204 also provides two mounting apertures for attachment to the guide rods 270, as described hereafter. This vertically disposed hinge provides a horizontal mobile degree of freedom allowing the tongue 10 to rotate laterally to follow divergent tractor and ground mark path anomalies.

Methods and mechanisms for modifying front tire separation on tractors and for altering steering rod connections to adjust for such changes are well known and will be described herein only in the detail necessary to fully describe the invention. Typically, after disconnecting each steering rod 260, front wheel 150 separation on a tractor 8 is made by removing a plurality of bolts 126 and associated nuts 116 then laterally adjusting the front wheel 150 separation by slidably moving each lateral axle part 122 and 120 through a brace 128 until the correct separation is achieved where apertures 124 in the lateral axle parts 122 and 124 are aligned with apertures 182 in central axle part 110. Bolts 126 and nuts 116 are replaced (see FIG. 2). The steering rod is then telescopically adjusted and reconnected as described below.

The tractor steering rod 260 ordinarily comprises two sets of telescoping members comprising two central rods 280, and two laterally disposed steering rods 282. A central steering arm 180 is centrally connected through a tie rod connection 138 to the centrally disposes part of each central rod 280 to communicate steering forces from the central tractor steering mechanism. Such forces may emanate from direct mechanical connection to a steering wheel or be indirectly received through hydraulic communication from a power steering system. Each outermost end of each lateral steering rod 282 is mechanically connected to a front wheel 150 through a tie rod end 136 and a leveraged turning mechanism 140 which are known in the industry and are therefore not further described.

As seen in FIG. 5, each lateral steering rod 282 comprises a solid rod with a plurality of apertures 262 serially disposed along its length. Each central steering rod 280 comprises a hollow rod which telescopically receives an associated lateral steering rod 282 for slidable, lateral adjustment in steering rod 260 length. Laterally disposed in each central steering rod 280 is at least one aperture which is alignable with apertures 262 and by which a bolt and lock-nut 142 securely affixes the length of each steering rod 260. Adjustment in the length of steering rod 260 is made by removing all of the one or more bolts and lock-nuts 142 from juxtaposed apertures in each central steering rod 280 and each lateral steering rod 282, telescopically adjusting steering rod 260 to a desired length, and replacing bolts and lock-nuts 142. If bolts and lock-nuts 142 are not replaced, each lateral steering rod 282 is free to reciprocally slide in and out of central steering rod 280 and the tractor steering system is effectively detached from each front wheel 150.

An important feature of the invention is allowance for play in the steering system whereby the central steering is effectively disconnected or made ineffective over a narrow steering range, within which the in-field automatic guidance or dirigible control system directionally controls the travel tractor 8 along the ground line, unencumbered by forces otherwise emitted by the steering system to steerable wheels 150. In the preferred embodiment, play is engendered through the use of a hollow steering limit cylinder, seen in one form in FIGS. 5 and 7 (i.e. cylinder 170) and in another form in FIGS. 17 and 18 (i.e. cylinder 480), which comprises essentially the same diameter and material characteristics as central steering rod 280.

In one preferred embodiment, each cylinder 170 is laterally adjustable along a lateral steering rod 282, but if affixed two a site on lateral steering rod 282, the centrally disposed edge 370, best seen in FIG. 7, provides a stop which discontinues outward, unretarded telescoping movement of an associated central steering rod 280, thereby reengaging an otherwise centrally disengaged central steering system. Cylinder 170 comprises a length such that at least one aperture 262 is fully covered as cylinder 170 is disposed along the length of lateral steering rod 282. In this depicted presently pre&erred embodiment of cylinder 170, a plurality of apertures 168 are disposed in a helical pattern around the circumference of cylinder 170 as best seen in FIG. 7. A cylinder with a different pattern of apertures may be used within the scope of this invention; however, the helical pattern of apertures provides an effectively greater number of positions per unit length of cylinder 170 where an aperture of cylinder 170 may be juxtaposed with an aperture of a lateral steering rod 282, providing a finer control of the position of the cylinder 170 along steering rod 282. Thus a cylinder 170 can be positioned with which greater precision along the length of a lateral steering rod 282 than the separating distance between apertures in the lateral steering rod 282 would otherwise allow. In this currently preferred embodiment, the helical pattern allows a stop to be set a one quarter inch intervals.

Thus, when bolts and nuts 142 are removed and cylinder 170 is positioned such that there is a distance of separation or play 174 between the lateral end 252 of each central steering rod 280 and the proximal end 370 of a cylinder 170 which has been fixed in place on a lateral steering rod 282, there is a length for free movement or play through which the tractor steering system has no effect or control. A cylinder 170 is so positioned on each lateral steering rod 282 provides a length of limited play such that a forward directed steering system provides essentially no steering force on either front wheel 150. However, when the tractor steering system is further turned to engage a central steering rod 280 against the proximal edge 370 of a cylinder 170, steering forces are applied to each front wheel 150 to steer the tractor. Further, for finer control on setting the length of play 174 at least one washer 172 is introduced into the interspace between proximal edge 370 and lateral edge 252 to reduce the length of play 174.

Figures 17, 18:
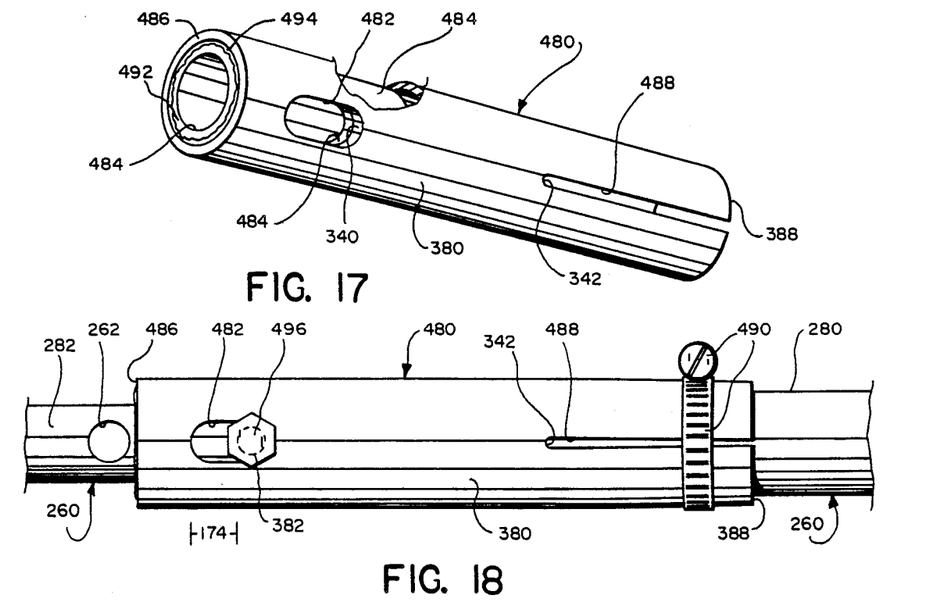
FIG. 17 is an enlarged perspective, with some parts broken away for clarity, of a lateral angle limiting, guide cylinder comprising a slot and a slit which provides relief for compressible attachment to a rod inserted therethrough.
FIG. 18 is a side view of the guide cylinder of FIG. 17 disposed along and compressibly attached to the steering rod of a tractor.

Another currently preferred embodiment of the hollow steering limit cylinder is seen in FIGS. 17 and 18. As seen in FIG. 17, cylinder 480 comprises a hollow cylindrical tube 380, having an inside diameter which snugly, but telescopically passes the insertion of central steering rod 280. A pair of juxtaposed slits 488 are cut into one end 388 of tube 380. Near the other end 486, tube 380 comprises a pair of juxtaposed slots 482. (Only the slot 482 nearest the viewer is seen in FIGS. 17 and 18.) A second smaller cylinder 484, comprising diametral dimensions similar to central steering rod 280 and a length which extends beyond the most medial portion 340 of slot 482, but which does not extend to the most medial segment 342 of slit 488, is disposed near end 486. With ends 486 and 492 of cylinders 380 and 484, respectively, disposed in the same plane, a weldment 494 permanently joins cylinders 380 and 484 to form cylinder 480. Slot 482 is extended through both faces of enclosed cylinder 484, forming two identical open slots 482 on opposite faces of cylinder 480.

In use, cylinder 480 is disposed across the junction of medial steering rod 280 and later tie rod 260, after front wheel separation is set, such that slitted end 388 is disposed along central steering rod 280. Slot 482 is disposed along lateral tie rod 282 such that slot 482 is symmetrically disposed about an aperture 262 in lateral tie rod 282 when the dirigible wheels are directed straight ahead. A clamp 490 is tightened about cylinder 80 and slits 488 to releasibly, but firmly, affix cylinder 480 to central steering rod 280. A bolt 496 is inserted through each juxtaposed slot 482 and symmetrically disposed aperture 262 and affixed by a nut and washer (not shown). So affixed bolt 496 restricts movement of lateral tie rod 282 relative to central steering rod 280 to a distance determined by the width of slot 82 and the diameter of bolt 496 shank 382 (seen as circular dashed lines in FIG. 18), thus determining length of play 174.

To provide automatic guiding forces from the tongue 10 to each lateral steering rod 282, guide rod mechanism 268 provides a connection from the tongue 10 to the lateral steering rod 282. Each guide rod mechanism 268 comprises a tie rod end 202, a tie rod connection 206, a guide rod 270, and a lateral tie plate 272 welded or otherwise permanently affixed along each vertical tangent at the lateral end 302 of guide rod 270. Guide rod 270 is essentially the same material and diameter as lateral steering rod 282, but is solid without serially disposed apertures. Guide rod 270 may be approximately thirty inches in length, although different lengths for tractors of various configurations and wheel separation are within the scope of the invention. Rod 270 is threaded on one end for a central connection to tie rod connection 206, which is a part of tie rod end 202. Each tie rod end 202 is affixed by a bolt and nut 276 to rear tongue plate 204. Such tie rod ends and tie rod connections are known and available in the art.

Figure 8:
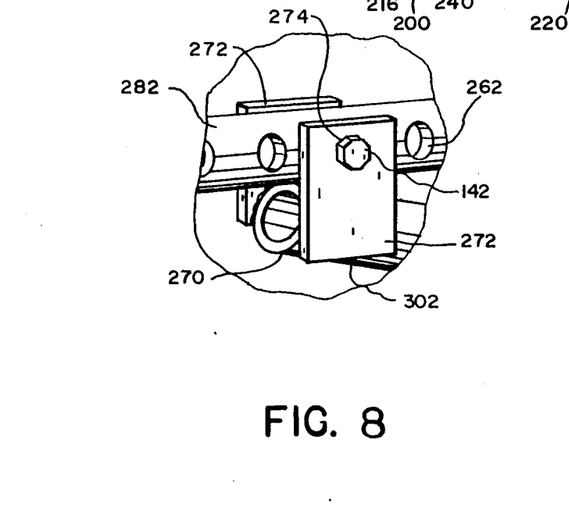
FIG. 8 is an enlarged fragmentary perspective of a guide rod attachment to the tractor steering rod.

As best seen in FIG. 8, each tie rod plate 272 may comprise a thickness of one-fourth of an inch and a rectangular face two and one-half inches high by two inches wide. Disposed in one-half of the face of plate 272 is an aperture 274 of a size consistent with attachment by bolts and nuts 142 to lateral steering rod 282. Along the other half of the face of plate 272, along a vertical tangent of guide rod 270, a first weldment is made to the lateral end of guide rod 270. A second plate 272 is disposed parallel to the first plate 272 and such that an aperture 274 of the second plate 272 is aligned with the aperture 274 of first welded plate 272 and welded thereat to guide rod 270. Each weldment is made at an angle which provides a connection between the lateral steering rod 282 and the tie rod 202. By placing apertures 274 and 262 in juxtaposed relation and affixing plates 272 to lateral tie rod 282 with a nut and bolt 142, lateral steering rod 282 is releasibly, but firmly, fastened to guide rod 270.

In preparation for use of ground system 300 on tractor 8, tongue support frame 200 is mounted to central axle 110 with L-shaped brackets and to tractor body structure 160 with mounting plate 232. Tongue 10 is connected to tongue support frame 200 by tongue bolt 250. The front tractor wheel 150 separation is set as desired and bolts and nuts inserted and tightened. A steering limiting cylinder 170 or 480 is affixed to each steering rod 280 at a position which permits the desired length of play 174. As an example, when steering limiting cylinder 170 is used, steering rod 260 is adjusted to a length compatible with the tractor wheel separation and fixed lengthwise by bolts and nuts 142. Each tie rod end 202 is bolted to rear tongue plate 204 and connected to guide rod 270. Each guide rod 270 is connected to a lateral steering rod 282 by the coupling provided by the pair of welded plates 272. tongue 10 is raised to off the ground orientation by providing a positive hydraulic pressure in hydraulic tube 42 which extends cylinder rod 34 forcing forward tongue member 12 to a full upward position.

Tractor 8 is driven to a place comprising a previously prepared ground line. If necessary, the toeing angle and separation of disks 80 are modified as required by the form of the ground line. Tractor 8 is aligned with the first ground line. Length determining bolts and nuts 142 are removed from contact between each central steering rod 280 and lateral steering rod 282 permitting play 174 between each central steering rod edge 252 and medi-cylinder edge 370. The hydraulic pressure is relieved from tube 42 and cylinders 80 are brought into contact with the ground line. Tractor 8 is accelerated to be guided by feedback from the ground line. At the end of the row, ditch, windrow or other ground line, the disks 80 are again raised from the ground and tractor 8 is steered through the tractor steering system, comprising turning the steering wheel sufficiently far to take up the play 174 before contact of cylinder 170 with central steering rod 280. Tractor 8 is steered into alignment with a second ground line and the automatic guiding process is repeated. Before the tractor is removed from the field, the bolts and nuts 142 can once again be replaced in central steering rod 280 and lateral steering rod 282 to fix the length of steering rod 260 such that play is removed when transporting tractor 8 from worksite to worksite. Guidance function and operation, when using cylinder 480 rather than cylinder 170 is the same; however before reconnecting central steering rod 280 to lateral steering rod 282, cylinder 480 must be released and disposed away (rom he junction between cental steering rod 280 and lateral 282 where, when disposed for use, cylinder 480 covers the juxtaposed apertures where bolts and nuts 142 are replaced to fix the length of steering rod 260 and remove play.

Figures 11, 12:
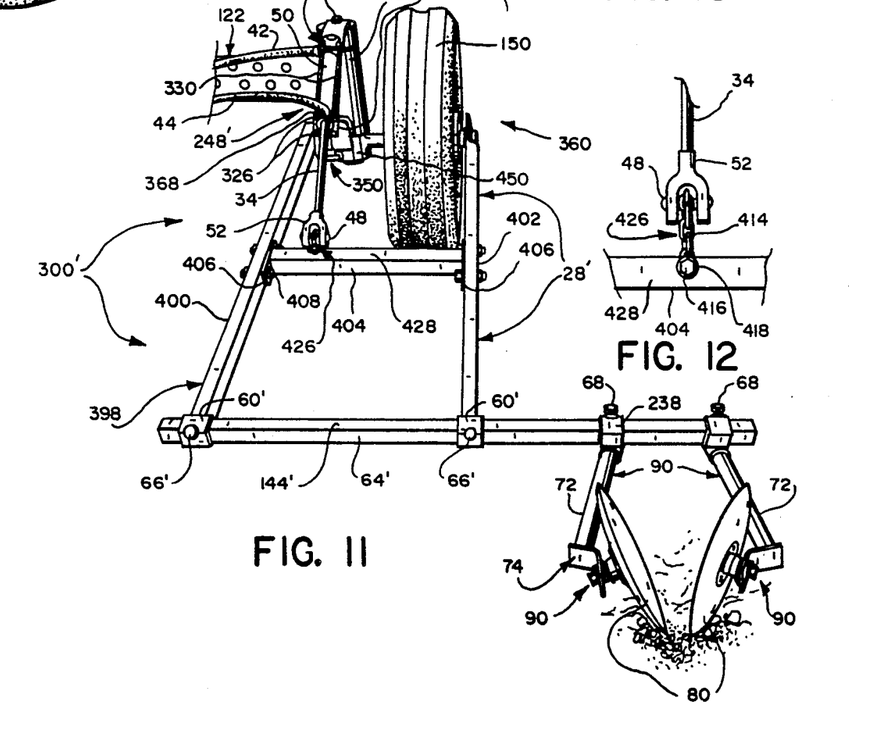
FIG. 11 is a left frontal fragmentary perspective shoving an automatic in-field dirigible control system with the ground line sensor directly mechanically coupled to the right front wheel of the tractor.
FIG. 12 is an expanded fragmentary overhead view of the chain attachment between the hydraulic cylinder and ground line sensor of FIG. 11.

In another currently preferred embodiment seen in FIG. 11, a guidance system, generally designated 300', comprises a ground line sensing assembly 28' directly, mechanically tied to a front wheel 150. The ground line sensing assembly 28' comprises a frame assembly 398, a hydraulic cylinder assembly 248', and disk assembly 90. Guidance system 300' further comprises hydraulic tubes 42 and 44 and related controls and play 174 limiting cylinders 170 and 480, each of which is earlier described and not shown in FIG. 11.

Frame assembly 398 comprises a forward cross member 64', a medial lateral brace 404, an inner longitudinal member 400, and outer longitudinal member 402, and an outer guidance connection assembly 360 and a medial guidance connection assembly 350. Forward cross member 64' is similar to cross member 64, earlier described, and provides support for disk assembly 90, also as earlier described.

Figure 14:
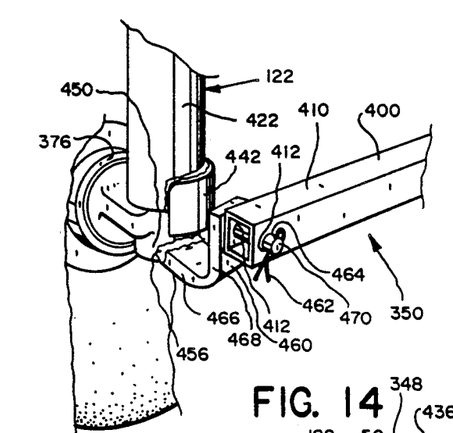
FIG. 14 is a right rearward fragmentary perspective of the medial connection between the ground line sensor of FIG. 11 and the dirigible wheel assembly.
Figure 15:
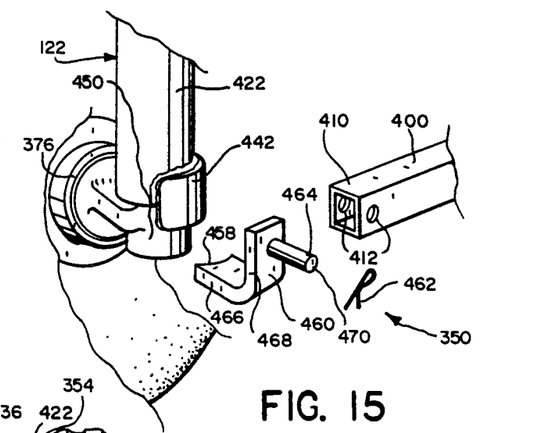
FIG. 15 is an exploded perspective of the parts shown in FIG. 14.

Referring to FIG. 11, 14, and 15, inner longitudinal member 400 comprises a rear connection to a medial guidance connection assembly 350, a centrally disposed connection to medial lateral brace 404, and a frontal connection to slide bracket 60' which, in combination with another slide bracket 60' is frontally connected to outer longitudinal member 402, releasibly affixes forward cross member 64' laterally. Outer longitudinal member 402 comprises a rear connection to outer guidance connection assembly 360, a centrally disposed connection to medial lateral brace 404, and a frontal connection to bracket 60', as earlier mentioned. Longitudinal members 400 and 402, medial lateral brace 404, and forward cross member 64' are made from square bar stock similar in cross sectional dimension to cross member 64, earlier described.

Figure 16:
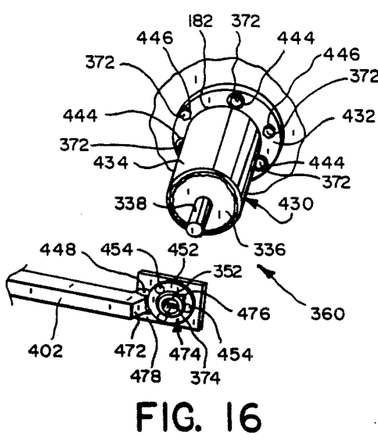
FIG. 16 is a medial perspective of a hub connection between the dirigible wheel and the outer longitudinal member of the sensor frame, showing some parts separated for clarity.

Directly attached to wheel 150 via a hub connection is outer guidance connection assembly 360, best seen in partly assembled condition in FIG. 16. Outer guidance connection assembly 360 comprises a hub connection assembly 430 and bearing assembly 474. Hub connection assembly 430 comprises a central cylindrical part 434 attached by welding or the like at one end 182 to a lugbolt attachment ring 432 and on the other end to a circular plate 336 from which a circular rod 338 medially extends. Lugbolt attachment ring 432 comprising apertures, generally designated 444 and 446, alternatingly placed around lugbolt attachment ring 432 and having the same diametral and circumferential spacing as wheel 150 lugbolts. Apertures 446 are seen to be smaller than apertures 444 such that lug nuts 372 releasibly and compressively affix lugbolt attachment ring 432 to wheel 150 when thereon tightened, while lug-nuts 372 pass through apertures 444 to affix wheel 150 only.

Bearing assembly 474 comprises an essentially square mounting plate 478, a bearing 352, and weldment 448 which permanently affixes bearing assembly 474 to the rearward end 472 of outer longitudinal member 402. Further, bearing 352 is readily available in the art and, as purchased, comprises a mounting ring 452 which is attached by inserting bolts or rivets 454 through juxtaposed apertures in mounting ring 452 and mounting plate 478 and thereat firmly fastening one to the other.

Bearing assembly 474, so attached to outer longitudinal member 402, is attached to hub assembly 430 and thereby to wheel 150 via bearing 352 by inserting rod 338 through bearing aperture 374 and securing bearing 352 to rod 338 by a set screw 476 or an eccentric connection or both.

As seen in FIGS. 14 and 15, medial guidance connection assembly 350 comprises an L-shaped inner guide attachment 460 and cotter key or pin 462. Inner guide attachment 460 is a steel bar comprising a central right angle bend forming horizontal leg 466 and vertical leg 468. Centrally disposed and extending horizontally and medially from vertical leg 468 is mounting rod 470. The lateral horizontal end 458 of horizontal leg 466 comprises a circular cut which matches the outer radial dimension of the downwardly extending base 450 of steering arm 140 offset medially from place of attachment to wheel bearing 376. The horizontal leg 466 of inner guide attachment 460 is permanently attached by weldment 456 to base 450 disposed below shield 442 which a permanent member of the vertical segment 422 of tractor axle 122, as seen in FIG. 14.

Inner longitudinal member 400 comprises two horizontally disposed juxtaposed apertures 412 at rearward end 410, as seen in FIG. 15. As seen in FIG. 14, a vertical hinge is made between mounting rod 470 and inner longitudinal member 400 by guiding mounting rod 470 through apertures 412. Mounting rod 470 further comprises an aperture 464 for the cotter key 462 at a point where an inserted mounting rod 470 extends medially beyond connected inner longitudinal member 400. Once inserted, the connection is releasibly affixed by cotter key 462.

Figure 13:
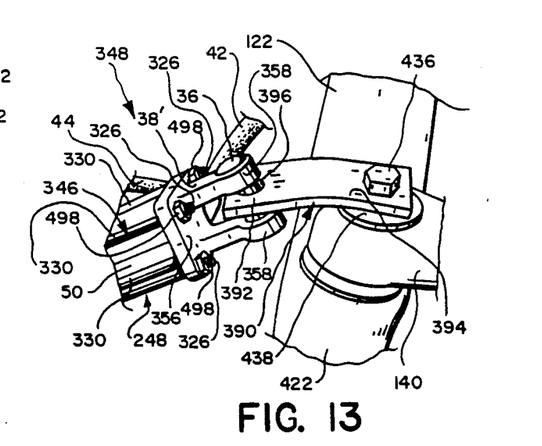
FIG. 13 is an enlarged right fragmentary perspective of a hydraulic cylinder and tractor steering arm connection.

Referring again to FIG. 11, Hydraulic cylinder assembly 248' performs the same vertical control of system 300' as hydraulic cylinder assembly 248 performs for system 300 except disk assembly 90 is lowered to ground contact when cylinder rod 34 is protracted and raised when cylinder rod 34 is retracted. Hydraulic cylinder assembly 248' comprises hydraulic cylinder 50, a rear cylinder attachment assembly 348, hydraulic tubes 42 and 44, and a forward attachment assembly 426. Hydraulic cylinder 50 is as earlier described. As seen in FIGS. 13 and 14, rear cylinder attachment assembly comprises an angled bar 390, a rearward U-shaped attachment plate and extension 38', a forward holding plate 354, spacer rods 330, long screws 326, and nuts 498.

Angled bar 390 comprises an obtuse central lateral bend which comprises a horizontal rear leg 394 and a forward downwardly disposed leg 392 when mounted on steering arm 140. Rear leg 394 comprises an aperture through which an already available connecting bolt 436 and washer 438 are used to connect the rear leg 394 to steering arm 140. Forward leg 392 comprises a enlarged aperture 396 through which a loosely fitting bolt 36 is inserted forming a junction which allows moderate vertical movement.

Attachment plate 38' comprises a flat base plate 356 with two juxtaposed ears 358 extending upwardly from opposed edges of attachment base plate 356. Ears 358 comprise juxtaposed apertures for connecting bolt 36. Connection is made between attachment plate 38' and forward leg 392 by inserting bolt 36 through the juxtaposed holes in each ear 358 and aperture 396, thus forming a loosely formed link. Each corner of attachment plate 38' comprises an aperture for a screw 326. Forward holding plate 354 comprises similar corner apertures. Forward holding plate 354 also comprises a central hole 368 which is larger than rod 34 which reciprocates therethrough, but smaller than the girth of cylinder 50 which is restrained thereat by an attached forward holding plate 354. Forward holding plate 354 is attached to base plate 356 by an assembly comprising plates 354 and 356 and a framework 346 formed by long screws 326 and spacers 330 and releasibly affixed by nuts 498. To assemble framework 346, cylinder rod 34 is inserted through hole 368 to firmly abut forward holding plate 354 against cylinder 50. Screws 326 are inserted through the corner holes of forward holding plate 354 and spacers 330 slidably assembled to cover a mid-portion of each screw 326. Further each screw is inserted through a corner aperture in base plate 356 whereat application of a nut 498 on each screw 326 firmly captures cylinder 50 between the four spacers 330 and plates 356 and 354.

At the forward end of rod 34, previously described U-shaped hinge bracket 52 is fitted with a bolt 48 to capture chain 414 therein forming a part of front cylinder attachment assembly 426, as best seen in FIG. 12. Front cylinder attachment assembly 426 is completed by attaching chain 414 to medial lateral brace 404. As best seen in FIG. 11, medial lateral brace 404 is interposed forward of wheel 15 between inner longitudinal member 400 and outer longitudinal member 402. Medial later brace 404 is firmly affixed to each inner longitudinal member 400 and outer longitudinal member 402 by an end plate 406, one of which is welded to each end of medial lateral brace 404. Each end plate 406 comprises at least two apertures which are juxtaposed with matching apertures in inner longitudinal member 400 and outer longitudinal member 402 wherethrough bolts 408 are inserted and secured with a nut. To complete the attachment of chain 414 to medial lateral brace 404, cylinder 50 is aligned back to front with the connection of angled bar 390 to steering arm 140. In line with a so disposed cylinder 50, brace 404 comprises an aperture therethrough, such that a bolt 416 and washer 418 secured with a nut (not shown) affixes chain 414 to the top 428 of brace 404. There positioned, activation of hydraulic fluid pressure through tubes 42 and 44 protracts and retracts, respectively, cylinder rod 34 to lover and raise disk assembly 90 from the ground.

Each forward support member 60' is attached to the forward end of each lateral member 400 and 402 by a butt-end-weld. Each forward support member 60' comprises a rectangular bracket through which forward cross member 64' is slidably, laterally adjusted. The lateral position of forward cross member 64' is adjustable by releasing the tension provided by each set screw 66' and moving cross member 64' to the desired position. Attached to forward cross member 64' in a manner similar to attachment to cross member 64, earlier described, is disk assembly 90. All of the features and parts earlier ascribed to disk assembly 90 apply to this attachment, as well. In this embodiment, disk assembly 90 may be attached to an outwardly extending cross member 64' as shown in FIG. 1 or to a medial section 144' of cross member 64' or to an inwardly extending cross member 64' (a cross member 64' position which is not shown) or any combination of thereof within the scope of the invention.

A system 300' can be attached to each front wheel 150 providing twice the sensing torque of a single system 300'. When more than one system 300' is employed, a single hydraulic control system is commonly used to raise and lower all systems in tandem. As well, a single system 300' may comprise more than one disk assembly 90 to commensurately increase sensing torque.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An agricultural tractor comprising dirigible wheels, a steering system and an in-field automatic control system by which automatic steering of the tractor occurs along a ground line, said in-field automatic control system comprising:
   sensing means by which the ground line is torsionally sensed;
   means, carried by the tractor, for supporting the sensing means so that sensing of the ground line is accommodated;
   dirigible means coupled by mechanical linkage means to both the supporting means and the dirigible wheels by which the wheels are selectively turned by said mechanical linkage means into alignment with the ground line responsive to operation of the sensing means.

2. An agricultural tractor according to claim 1 wherein the dirigible means comprise means connected by additional mechanical linkage means to means comprising part of the steering system.

3. An agricultural tractor according to claim 2 wherein said part means comprise at least first and second interconnected steering means and means by which a predetermined range of play is caused to exist between the first and second interconnected steering means whereby said selective turning is within the range of play and is essentially without effect upon steering via the steering system.

4. An agricultural tractor according to claim 1 wherein the sensing means comprise means which torsionally sense two ground lines.

5. An agricultural tractor according to claim 1 wherein said sensing means comprise ground engageable mechanical sensor means which are connected directly by mechanical linkage means to the dirigible means and by which ground information detected by the sensor means is fed back through the dirigible means to the dirigible wheels.

6. An agricultural tractor according to claim 6 wherein said sensing means comprise adjustment means whereby orientation of said sensing means is adjusted to best respond to the ground line.

7. An agricultural tractor according to claim 5 wherein said sensing means comprise guide disk means comprising at least two spaced disks and means by which a plurality of adjustments may be selectively made to better sense the ground line.

8. An agricultural tractor according to claim 7 wherein said adjustments means comprise toeing angle adjustment means, lateral slanting angle adjustment means, and guide disk separating adjustment means.

9. An agricultural tractor according to claim 7 wherein said adjustments means comprise means by which the disk means are laterally and vertically selectively adjusted.

10. An agricultural tractor according to claim 5 wherein said sensing means comprise sensor disengagement means whereby said sensing means are removed from ground engagement to permit the tractor steering system to be exclusively used in turning the tractor.

11. An agricultural tractor according to claim 10 wherein said sensor disengagement means comprise a hydraulic cylinder carried by the support means by which the mechanical sensor means are selectively lifted from and lowered into ground engagement.

12. An agricultural tractor comprising dirigible wheels and a composite steering system associated with the dirigible wheels, the composite steering system comprising first steering means comprising operator responsive steering control means associated with the dirigible wheels by which steered turns in excess of a predetermined amount are manually caused to occur, the composite steering means further comprising second steering means comprising ground engaging alignment sensing means solely coupled by mechanical linkage means to the dirigible wheels by which steering turns less than said predetermined amount are caused to occur.

13. An agricultural tractor according to claim 12 further comprising play-defining means by which said predetermined amount of steering is established without engaging the first steering means and composite steering means at the same time.

14. An agricultural tractor according to claim 13 wherein the play-defining means comprise interrelated telescoping members comprising adjustment means by which the predetermined amount can be selectively changed.

15. An agricultural tractor according to claim 14 wherein second steering means comprise dirigible means interposed between the sensing means and the play defining means.

16. An agricultural tractor according to claim 14 wherein second steering means comprise dirigible means connected to at least one dirigible wheel means.

17. An agricultural tractor according to claim 13 wherein the interrelated telescopic members accommodate relative telescopic travel therebetween and wherein the play-defining means comprise stop means which limit said telescopic travel to said predetermined amount.

18. An agricultural tractor according to claim 17 wherein the stop means comprise adjustable means by which the location of the stop means can be changed to selectively vary the telescopic travel.

19. An agricultural tractor according to claim 12 wherein the second steering means comprise tie rod means.

20. An agricultural tractor according to claim 12 wherein said ground engaging sensing means comprise guide disk means which comprise at least two spaced ground line following guide disks.

21. An agricultural tractor according to claim 20 wherein the guide disk means comprise toeing angle adjustment means, lateral slanting angle adjustment means, and guide disk separating adjustment means.

22. An agricultural tractor according to claim 20 wherein said second steering means comprise support means for carrying the sensing means, the support means comprising means accommodating lateral and vertical displacement of the sensing means along the ground.

23. An agricultural tractor according to claim 22 wherein said support means comprise disengagement means whereby said sensing means are removed from ground contact to permit the first steering means to be the only means by which steering can take place.

24. An agricultural tractor according to claim 23 wherein said disengagement means comprise hydraulic cylinder means which selectively lifts the support means to lift the sensing means from the ground and lowers the support means to cause the sensing means to engage the ground.

25. An agricultural tractor comprising a power steering means and in-field steering means which responsively guides the tractor by directional feedback received from a guidance apparatus solely coupled by mechanical linkage means;
the power-steered-tractor further comprising dirigible wheels;
first tie rod means which connects the power steering means to the dirigible wheels;
the solely mechanically linked guidance apparatus comprising a ground engaging sensor and second tie rod means which mechanically and directly communicate sensor-drived forces the dirigible wheels; and
means for producing play between the power steering means and the in-field steering means whereby the dirigible wheels are controllably turned with a predetermined range by sensor derived forces without interfering with the power steering means.

26. An agricultural tractor comprising power steering means and in field steering means which responsively guides the tractor by directional feedback received from a mechanically coupled guidance apparatus;
the power-steered-tractor further comprising dirigible wheels;
first tie rod means which connects the power steering means to the dirigible wheels;
the mechanically coupled guidance apparatus comprising a ground engaging sensor and second tie rod means which mechanically and directly communicate sensor-derived forces to the dirigible wheels;
means for producing play between the power steering means and the in field steering means whereby the dirigible wheels are controllably turned within a predetermined range by sensor derived forces without interfering with the power steering means; and
the first tie rod means further comprising outer and inner telescopically interrelated members each of which defines a plurality of alignable, dimensionally similar apertures.

27. An agricultural tractor according to claim 26 wherein the first tie rod means are adjustable telescoped to vary the length of the tie rod means and fixed in length by releasable fastener means through juxtaposed axial apertures in each telescopically adjusted member, whereby the length of the first tie rod means is adjusted when the dirigible wheels are variably separated to accommodate wheel placement setting for travel along any of a ground line defining furrow, unplanted row, spaced ridges, and a terrain groove.

28. An agricultural tractor according to claim 27 wherein the second tie rod means comprise telescopically adjustable tie rod means whereby the length of the second tie rod means is selectively adjusted when the dirigible wheels are separated to accommodate wheel placement setting for travel within any of the furrow, the unplanted row, the space ridges, and the groove.

29. An agricultural tractor according to claim 28 wherein the first tie rod means are released to telescope freely one member within another and the second tie rod means are secured at a related fixed length which selectively sets the dirigible wheels for travel within any of the furrow, the unplanted row, the spaced ridges, and the groove.

30. An agricultural tractor according to claim 29 wherein the means for producing play comprises stop means which provide a limit for the telescopic travel of the first tie rod means whereby, at a predetermined maximum lateral guidance angle, further telescoping of the first tie rod means is blocked and the guidance forces of the power-steering control the dirigible wheels.

31. An agricultural tractor according to claim 30 wherein the stop means comprise hollow cylindrical stop means which comprise internal dimensions similar to the outer dimensions of the inner telescoping member of the first tie rod means whereby said hollow cylindrical stop means are slidably placeable along the length of the inner member of the first tie rod means.

32. An agricultural tractor according to claim 31 wherein the hollow cylindrical stop means further comprise a plurality of apertures, dimensionally similar to the apertures in the telescoping members of the first tie rod means, but disposed in a helical pattern around the circumference of said hollow cylindrical stop means such that the position of said hollow cylindrical stop means is adjustable in increments substantially smaller than the diameter of one of the apertures.

33. An agricultural tractor according to claim 30 wherein washers are placed between said stop means and the outer member of the first tie rod means whereby a vernier adjustment is made in the magnitude of the maximum lateral guidance angle.

34. An agricultural tractor according to claim 26 wherein the ground engaging sensor is coupled to the dirigible wheels and provides feedback which steers the tractor within the limits of the lateral guidance angle.

35. An agricultural tractor according to claim 34 wherein said sensor comprises means which are adjusted to fit within a previously prepared ground line.

36. An agricultural tractor according to claim 35 wherein said sensor comprises guide disk means which comprise at least two spaced disks and adjustment means whereby the guide disk means are modified in preparation for sue to accommodate use with a specific ground line.

37. An agricultural tractor according to claim 36 wherein said adjustment means comprise means defining several degrees of freedom, the defining means comprise toeing angle adjustment means, lateral slanting angle adjustment means, and guide disk separating adjustment means.

38. An agricultural tractor according to claim 35 wherein said sensor comprises means defining at least two degrees of freedom of movement whereby movement of said sensor laterally and vertically follows the ground line.

39. An agricultural tractor according to claim 34 wherein said sensor comprises sensor disengagement means whereby said sensor is raised from ground engagement to permit the tractor power steering system to exclusively steer the tractor.

40. An agricultural tractor according to claim 39 wherein said sensor disengagement means comprise two way cylinder means which selectively lifts and lowers the sensor from and into ground engagement.

41. An agricultural tractor comprising:
a power steering means and in-field steering means which responsively guides the tractor by directional feedback received from guidance apparatus solely coupled by mechanical linkage means;
the power-steered-tractor further comprising dirigible wheels;
tie rod means which connect the power steering means to the dirigible wheels;
the solely mechanically linked guidance apparatus comprising a ground engaging sensor and directly connecting dirigible means which mechanically and directly communicate sensor-derived forces to the dirigible wheels; and
means for producing play between the power steering means and the in-field steering means whereby the dirigible wheels controllably turned within a predetermined range by sensor derived forces without interfering with the power steering means.

42. An agricultural tractor comprising:
a power steering means and in field steering means which responsively guides the tractor by directional feedback received from a mechanically coupled guidance apparatus;
the power-steered-tractor further comprising dirigible wheels;
tie rod means which connect the power steering means to the dirigible wheels;
the mechanically coupled guidance apparatus comprising a ground engaging sensor and directly connecting dirigible means which mechanically and directly communicate sensor-derived forces to the diribgible wheels;
means for producing play between the power steering means and the in field steering means whereby the dirigible wheels are controllably turned within a predetermined range by sensor derived forces without interfering with the power steering means; and;
the tie rod means further comprising outer and inner telescopically interrelated members each of which defines a plurality of alignable, dimensionally similar apertures.

43. An agricultural tractor according to claim 42 wherein the tie rod means are adjustably telescoped to vary the length of the tie rod means and fixed in length by releasible fastener means through juxtaposed axial apertures in each telescopically adjusted member, whereby the length of the tie rod means is adjusted when the dirigible wheels are variably separated to accommodate wheel placement setting for travel along any of a ground-defining furrow, an unplanted row, spaced ridges, and a groove.

44. An agricultural tractor according to claim 42 wherein the tie rod means comprise released means which relatively telescope freely.

45. An agricultural tractor according to claim 44 wherein the means for producing play comprises stop means which provide a limit for the telescopic travel of the tie rod means whereby, at a predetermined maximum lateral guidance angle, further telescoping of the tie rod means is blocked and the guidance forces of the power-steering control the dirigible wheels.

46. An agricultural tractor according to claim 45 wherein the stop means comprise a hollow cylinder further comprising a first segment which comprises internal dimensions similar to the outer dimensions of the inner telescoping member of the tie rod means and a second segment which comprises a pair of symmetrically disposed longitudinal tines, formed by two juxtaposed longitudinal slits along the second segment, and which comprises internal dimensions similar to the outer dimensions of the outer telescoping member of the tie rod means whereby said hollow cylindrical stop means are slidably placeable along the length of the inner member of the tie rod means and are slidably placeable along at least a portion of the outer telescoping member of the tie rod means to a position whereat a cinch or clamp is applied across said tines to releasibly affix the lateral and angular position of said hollow cylindrical stop means to the outer telescoping member.

47. An agricultural tractor according to claim 46 wherein the hollow cylindrical stop means further comprise at least one pair of juxtaposed longitudinal slot apertures, the width to each slot aperture being dimensionally similar to the apertures in the telescoping members of the first tie rod means, such that fastener means threaded through the slot apertures in the hollow cylindrical stop means and through an aperture in the inner telescoping member and affixed by fastener retainer means is free top slide in the slot apertures whereby the length of play is established.

48. An agricultural tractor according to claim 42 wherein the ground engaging sensor is mechanically coupled directly to the dirigible wheels by mechanical linkage means and comprise means providing feedback which steers the tractor within the limits of the lateral guidance angle.

49. An agricultural tractor according to claim 48 wherein said sensor comprises means which are adjusted to fit a previously prepared ground line.

50. An agricultural tractor according to claim 49 wherein said sensor comprises guide disk means which comprise at least two spaced disks and adjustment means whereby the guide disk means are modified in preparation for use to accommodate use with a specific ground line.

51. An agricultural tractor according to claim 50 wherein said adjustment means comprise toeing angle adjustment means, lateral slanting angle adjustment means, and guide disk separating adjustment means, by which several degrees of freedom are provided to the adjustment means.

52. An agricultural tractor according to claim 49 wherein said sensor comprises means defining at least two degrees of freedom of movement whereby movement of said sensor laterally and vertically follows the ground line.

53. An agricultural tractor according to claim 48 wherein said sensor comprises sensor disengagement means whereby said sensor is raised from ground engagement to permit the tractor power steering system to exclusively steer the tractor.

54. An agricultural tractor according to claim 53 wherein said sensor disengagement means comprise two way cylinder means which selectively lifts and lowers the sensor from and into ground engagement.

55. A method for operating an agricultural tractor comprising the steps of;

(1) steering the tractor into alignment with a ground line;
(2) lowering an automatic in-field steering sensor in to contact with the ground line;
(3) displacing the tractor to gernerally follow the ground line while turning dirigible wheels of the tractor solely responsive to direct feedback from mechanical linkage means coupled to the ground engaging sensor;
(4) lifting the automatic steering sensor from contact with the ground mark;
(5) steering the tractor into alignment with a second ground line; and
(6) repeating the aforestated steps (2) through (4).

56. A method of equipping a tractor with an automatic, tractor guidance system comprising the steps of:
p1 disassembling a telescoping steering rod assembly which comprises outer and inner telescoping members;
slidably positioning cylindrical steps along each inner member such that, as the members telescopically shorten, each outer member moves toward each cylindrical stop and reassembling the tractor's primary, telescoping steering rod assembly;
affixing the stops such that a predetermined amount of play is permitted in the telescoping steering rod assembly; and
attaching a ground engaging in field sensor and associated in field secondary steering rod assembly.

* * * * *